United States Patent [19]

Stanfield

[11] 4,021,912
[45] May 10, 1977

[54] TIRE TRIMMER AND BLADES THEREFOR

[75] Inventor: Charles Keith Stanfield, Matteson, Ill.

[73] Assignee: B. & J. Manufacturing Company, Glenwood, Ill.

[22] Filed: July 11, 1975

[21] Appl. No.: 595,292

[52] U.S. Cl. .................................. 30/280; 30/338; 30/355; 157/13
[51] Int. Cl.² ..................... B26B 3/00; B26B 9/02
[58] Field of Search ............ 30/280, 329, 338, 355, 30/357; 157/13

[56] References Cited

UNITED STATES PATENTS

| | | | |
|---|---|---|---|
| 1,534,310 | 4/1925 | Gaunt | 30/338 |
| 1,619,249 | 3/1927 | Duff | 30/338 X |
| 1,757,073 | 5/1930 | Boyle | 30/355 X |
| 2,807,877 | 10/1957 | Fryer et al. | 30/355 X |

FOREIGN PATENTS OR APPLICATIONS

| | | | |
|---|---|---|---|
| 147,925 | 8/1952 | Australia | 30/280 |

*Primary Examiner*—Al Lawrence Smith
*Assistant Examiner*—James G. Smith
*Attorney, Agent, or Firm*—Johnson, Dienner, Emrich & Wagner

[57] ABSTRACT

Manual tool used for trimming mold flash and protuberances from a tire has a handle with ends which are slotted to receive mounting flanges of a undulated sheet metal blade. The blade is so folded that its undulations comprise closely spaced ridges which extend from front to rear, are open on their underside and are united by narrow intervening webs. The underside of the lead edge of the blade is sloped along an arc and/or angle providing the blade with recesses in said leading edge between the ridges. The recesses have sharp cutting edges which cut entering flash close to the tire surface, the open under side of the ridges on either side of the webs providing clearance for missed flash and trimmings so that the tool blade is not raised off the tire surface in use of the tool.

11 Claims, 13 Drawing Figures

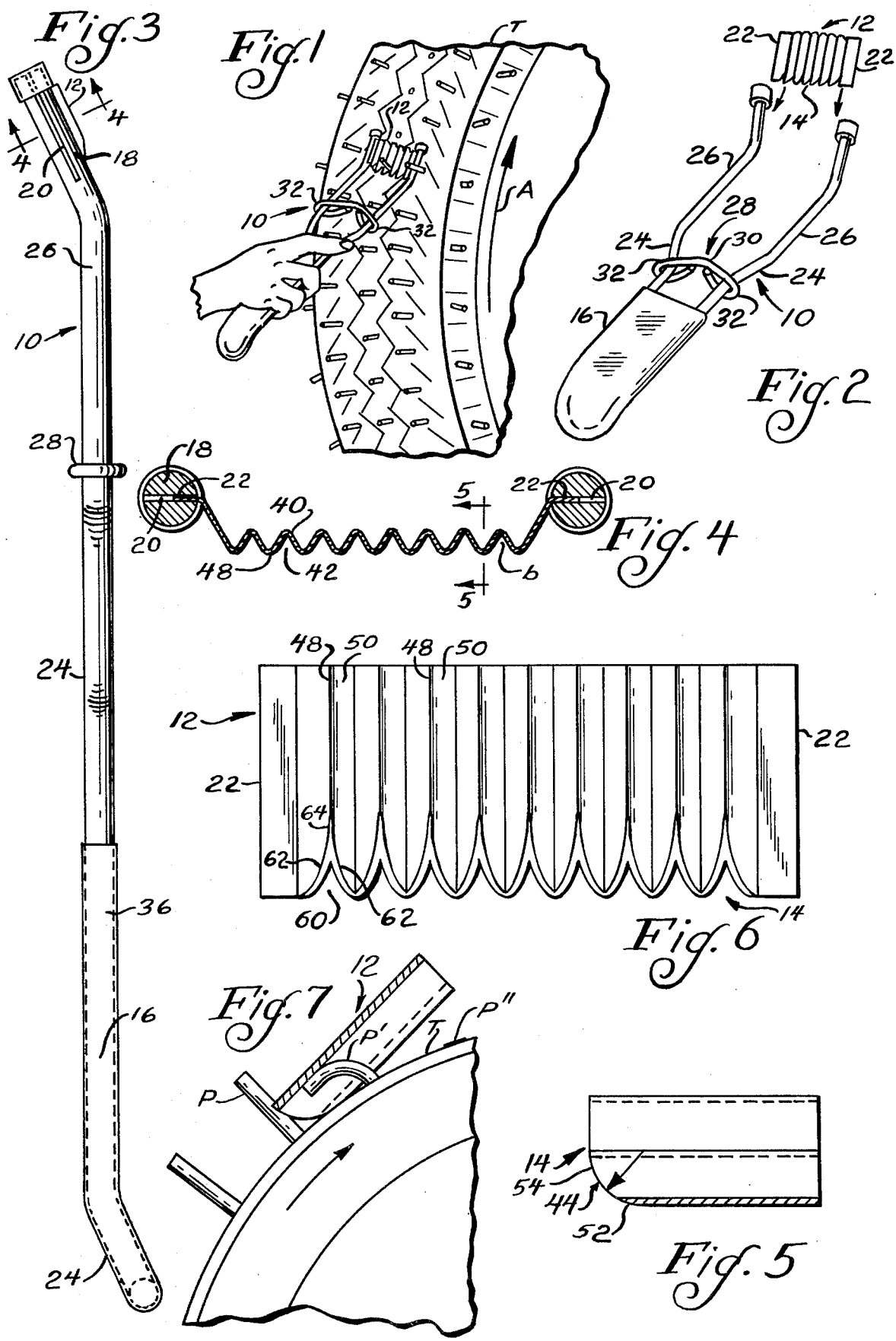

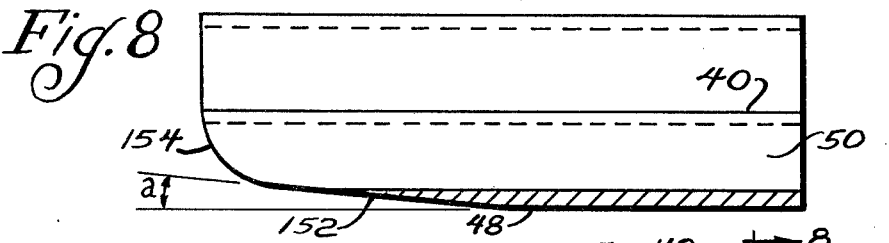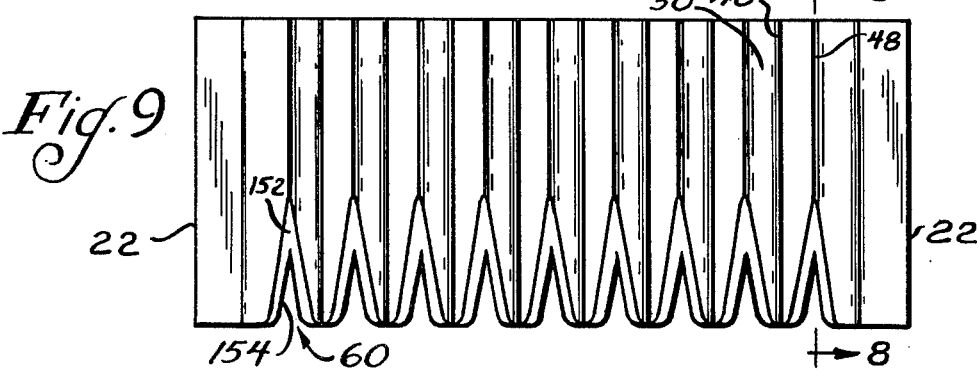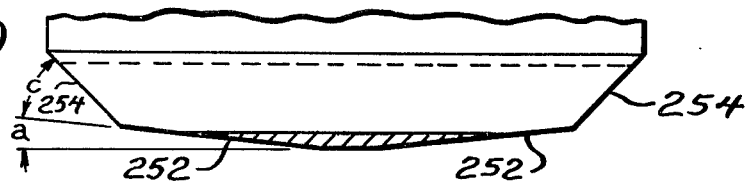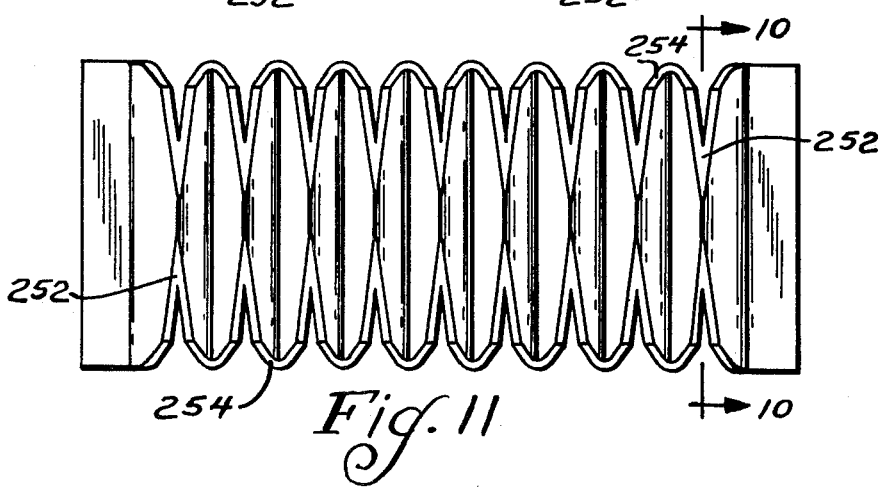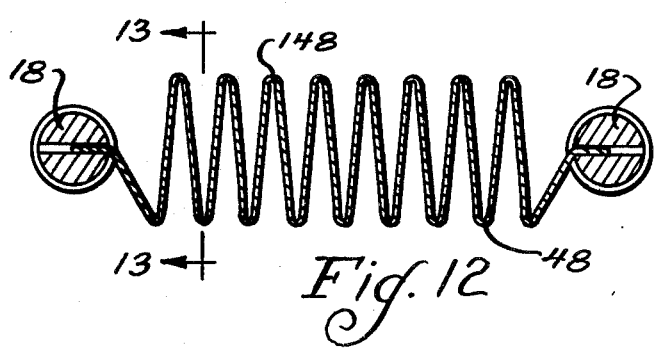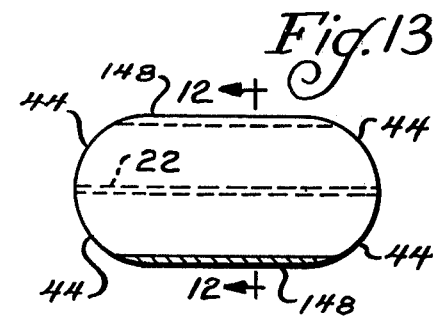

TIRE TRIMMER AND BLADES THEREFOR

This invention relates to tire trimmers such as are utilized by tire molders or retreading shops to remove the protuberances, tips or other mold flash which remain on the newly molded tread, shoulder or side wall of the tire upon its separation from the mold members.

Tools for this purpose are well known in the art. Such tools conventionally utilize rigid blades of solid sheet metal having a serrated leading edge to catch the protuberances and a planiform surface on their tire surface contacting side. See U.S. Pat. Nos. Fryer et al 2,807,877, Glodde 2,810,193 and Ricci 2,992,483 which are exemplary of such tools. One of the problems inherent in the use of such tools is the difficulty met in controlling the attack of the blade edge on the surface of the tire carcass. Such blades cut only the flash caught between the serrations and tend in passing over the uncut or missed flash and trimmings to be raised off the tire surface and to rock thereon. As a consequence the blades do not always cut the protuberances or tips close to the carcass surface but left stubble of varying heights. The poor contact or bouncing of the blade on the tire carcass surface as the blade moves over these trimmings or uncut mold strips also created other problems. Often the trimmer would dig in or catch on the tread surface of the tire with consequent injury to the tire itself. Also, if the operator did not maintain a firm grip on the tool, it would pull out of his hand and/or he would lose control thereof with possible injury to himself or other about him.

A principal object of the present invention was to provide an improved tire trimmer, the use of which would not be subject to these problems and drawbacks.

In accomplishing the aforesaid object, a tire trimmer according to the invention as hereinafter more specifically disclosed comprises a holder having a hand grip portion and a pair of end-slotted rod portions spaced therefrom and in which are removably received the mounting flanges of a regularly undulated sheet metal blade. The blade undulations extend generally front and rear or axially of the holder and define raised ridges with narrow intervening webs therebetween which engage the tire surface. The forward or leading edge of the blade is inclined on its underside at an angle along an arc such as to create recesses between the ridges and behind the blade edge, having sharp edges capable of shearing the entering flash close to the tire surface.

Thus a feature of the invention is that the recesses in the leading edge of the blade wedge the entering protuberances and other mold flash against sharp edges which closely shear the same while the raised ridges on either side of the recessed webs provide a clearance area or path through which trimmings or missed protuberances or mold flash may move without interrupting said close shear.

Thus a further feature of the invention is that the blade is less susceptible to bounce and is easily handled by the operator. It remains in substantially continuous contact with the tire surface under the force applied to the tool and is not lifted off by the passage of trimmings or uncut mold tips therebeneath. Thsoe mold tips which enter the recessed webs between the ridges are sheared close to the tire surface and with minimal or no remaining stubble.

A further feature is that the leading end of the ridges is spaced off the tire surface and blunted so that there is less tendency for the blade to dig in or catch the tire surface. This is further promoted by the inclination at which the blade is mounted in the holder.

A further feature is that the underside of the blades leading edge is so inclined that only minimal portions of the webs comprising its sharpened edge need be in contact with the tire surface, thus minimizing development of heat in use of the tool. The blade design further promotes circulation of air about the shearing action and discourages heat build up.

Still another feature of the invention is the increased flexibility of the blade which its undulated shape affords. This promotes the capacity of the blade to follow the shape of and also to intimately engage the tire surface so as to more clearly shear the protruding tips or mold flash. It also provides a blade that is durable and break-resistant.

Another feature is that the recessed cutting edges of the blades are easily and readily sharpened by passing a stone or emery paper thereacross. In sharpening, only a minimal amount of steel must be removed. In use of the tool, the sharpened edge remains in constant contact with the tire surface so that the blade edges are essentially self-sharpening and the blades require sharpening only at infrequent intervals.

Still other features of the invention include the disclosed novel construction of the holder and associated locking means which facilitate ready change of blades as needed for resharpening or replacement. At the same time the construction assures a secure mounting of the blade in its holder during use.

Being uncomplicated in construction, both the holder and blade are easy and economical to manufacture. At the same time the tire trimmer is convenient to utilize and it has a long useful life expectancy.

Many other objects, advantages and/or features will be at once evident or become so upon consideration of the preferred embodiments of the invention which now will be described.

In the accompanying drawings:

FIG. 1 illustrates a tire trimmer in accordance with the invention being utilized to clear mold flash or protuberances from the tread of a rotating tire carcass;

FIG. 2 is a second view of the tire trimmer and shows the blade removed from its holder;

FIG. 3 is a side view in elevation of the tire trimmer;

FIG. 4 is a sectional view taken through the holder and its blade along line 4—4 of FIG. 3 looking in the direction indicated by the arrows;

FIG. 5 is a sectional view taken through the blade along line 5—5 in FIG. 4 looking in the direction indicated by the arrows;

FIG. 6 is a plan view of the underside of the illustrated embodiment of the invention;

FIG. 7 is a somewhat schematic view illustrating the action of the blade on the mold flash or protuberances;

FIG. 8 is a view generally similar to FIG. 5, but on a larger scale, of a second embodiment of the invention in which the leading edge of the blade has been differently sharpened, the view being a section taken through the blade of FIG. 9 along lines 8—8;

FIG. 9 is a plan view of the underside of the modification of the blade illustrated by FIG. 8;

FIG. 10 is a view generally similar to FIGS. 5 and 8 showing still another embodiment of the invention, said view being of a section taken through the blade of FIG. 11 along lines 10—10; and FIGS. 12 and 13 illustrate still another embodiment of the invention, FIG. 12 being a sectional view taken along lines 12—12 of FIG. 13 and FIG. 13 a sectional view taken along lines 13—13 of FIG. 12.

Referring now more specifically to the several views which illustrate the invention, and wherein like parts are identified by like reference numerals, in FIGS. 1, 2 and 3, a holder indicated generally at 10 removably supports a sheet metal blade 12 with its leading end or forward edge 14 facing the hand grip portion 16 of the holder 10. The holder 10 is illustrated as comprising a rod bent into a generally U-shape. The free end portions 18 of said rod are parallel slotted as indicated at 20 (FIGS. 3 and 4) to receive the mounting flange ends 22 of the sheet metal blade 12. Said slotted end portions 18, and thereby blade 12, as illustrated in FIG. 3 are inclined to the general plane of the remainder of the holder, including its hand grip portion 16. The hand grip portion therefore may be held off the rotating tire with blade 12 in engagement with the tire surface T in the normal use of the tool as illustrated by FIG. 1. The hand grip portion 16 of the U-shaped rod is illustrated as of a width somewhat narrower than the slotted ends 18 of the rod. The outer end 24 of hand grip portion 16 is preferably set at a similar small angle to the plane of the holder and which is oppositely inclined to the inclination of the slotted end portions 18. Said inclined outer end 24 thus constitutes a stop which resists slipping of the holder from the operator's grasp during use. In practice, it has been found sufficient to incline both said end 24 of the hand grip portion 16 and the slotted end portions 18 of the holder at opposite angles in the order of 15°–40° to the general plane of the holder.

Between the hand grip portion 16 and its inclined slotted end portions 18 the holder comprises outwardly converging portions 24 and parallel portions 26 along which locking means in the form of a slip ring retainer 28 is slidably assembled. As seen best in FIG. 2, the slip retainer ring 28 is bent at its mid point 30 at a small angle such that said mid point is offset from the engagement of its opposed ends 32 about the two rods 24,24. As shown, its ends 32 are crimped close to said bend 30 and form loops 34 (FIG. 1 also) only slightly larger than the rod diameters they encircle. These loops are so spaced apart that when slid onto parallel portions 26, the slip ring places the slotted end portions 18 thereof under slight tension. In order to separate slotted ends 18 in removing blade 12, slip ring 28 is slid along the converging rod portions 24 to adjacent hand grip 16. This allows slotted rod end portions 18 to spring apart sufficiently to allow the insertion or removal of the flange ends 22 of the blade into slots 20. Slip ring 28 is then moved outwardly along the outwardly converging portions 24 to draw the slotted end portions 18 toward each other and over the parallel rod portions 26 so as to tightly secure or mount the blade therebetween. The inner dimensions of slip ring 28 being less than the corresponding distance which separates the outer surfaces of parallel rod portions 26 places increased tension upon the slip ring 28 when forced from the outwardly converging rod portions onto said parallel rod portions 26. This causes the slip ring to somewhat straighten at bend 30 and thereby to accommodate the increase width of the parallel rod portions 28. The resultant snug fit of the slip ring about said rod portions 26 resists its sliding therefrom and positively secures the blade 12 with its flanges 22 in slots 20. Caps 34 affixed to the free ends of the slotted rods 14 prevent axial separation of the blade 12 from said slots in use of the tool. Hand grip portion 16 is covered by a protective sheath of non-skid vinyl or other suitable plastic material as illustrated at 36, having a shrunk fit therewith. The non-skid surface of sheath 36 and the inclination of its end portion 24 promotes the operator's secure grasp of the holder in use of the tire trimmer. Other suitable hand grip means may also be mounted over said bent rod portions 16.

Referring now to FIGS. 4, 5 and 6, a first embodiment of a blade for a tire trimmer in accordance with the invention now will be described. Blade 12 may be of any suitable specialty spring steel or other sheet metal which is flexible and hard, yet break-resistant. The illustrated undulated shape of the blade is formed by folding the sheet metal into sharply defined closely arranged folds comprising a plurality of straight and generally parallel, regularly and equally curved ridges 40 and hollows 42 (FIG. 4) and the blade is completed by grinding its leading edge 14 (FIG. 5) on the underside 44 thereof across the width thereof on either a constant or a variable radius, a compound angle or some combination of angles and radii thereof which afford a blunted end to the ridges 40 and an acutely sharpened edge to the web 48 between each adjoining pairs of ridges.

In said folding operation, portions of the sheet metal on either side of the undulations or ridges 40 are left flat, parallel and in a common plane to constitute the aforedescribed mounting flanges 22. Importantly, the ridges 40 are closely folded and on short radii approaching the sheet metal thickness such that webs 48 therebetween are relatively narrow as are also the hollows 42 beneath the raised ridges 40. The hollows 42 beneath the ridges and the spaces therebetween over the webs, however, should be wider than the mold tips or protuberances P, which the tool is intended to remove in its use on the newly molded tire tread or carcass. The height of the folds or ridges 40, as illustrated in FIGS. 3 and 4, is related to the blade flanges 22 such that when assembled in holder 10, the interconnecting webs 48 between the ridges 40 will be disclosed below the slotted rod portions 18 and to have contact with the tire surface T uninhibited by said supporting rods 18 (FIG. 4). As mentioned, the undulations or ridges 40 comprising the working area of the blades may be characterized as having a generally vee-shape in cross section, although rounded at the apex thereof. In a preferred blade form, walls 50 of these raised ridges 40 include an angle $b$ of approximately 60° and less than 90°. The openings 42 beneath said ridges have an approximate height and width of roughly 5/32 inches at their widest point. When blade 12 is properly assembled within the holder as illustrated in FIG. 4, said folds 40 may be described as consisting of closely spaced parallel straight raised ridges 40 having their inclined walls 50 united by the aforementioned intervening narrow webs 48, which contact the tire carcass surface T. The hollow 42 beneath these ridges 40 and on either side of the webs are open at both ends and along their full extent so that the webs 48, which are similarly narrow in width and convex to the tire surface T, have essentially linear contact therewith at spaced intervals across the width of the blade.

Referring now to FIGS. 5 and 6 in the first form of the invention, the slope of the underside 44 of the leading end of the ridge walls 50 is turned on a radius defining an arc considered tangent to the tire contacting surface of web 48. As a consequence, the leading edge of the blade is provided with a plurality of recesses 60 between the raised ridges 40 and the webs have a sharp and leading edge 52 spaced behind the more blunt leading edges 54 of the ridges. In a second form of the invention illustrated by FIGS. 8 and 9, the leading edge 152 of the webs 48 is sharpened at an angle $a$ in the order of 5° to the plane defined by the webs. Although the angle $a$ may vary somewhat from said 5°, the more acute the disposition of the slope 152 of said underside of then leading edge of the web, the sharper is said edge and the more effective is its shearing action on the protuberances. In order to increase the blade's capability to ride on the tire surface without digging into or catching on the sides of the tire surface, the leading edge of the ridges are blunted by rapidly turning them upwardly from said acutely angled or sharpened edge of the web 48. In FIG. 8 this is obtained by turning the leading edge 154 of the ridges on a short radius to define a sharply rising arc which blends into the acutely angled slope 152 of the leading edge of the webs 48. In FIGS. 10 and 11 a further form of the invention is illustrated wherein the leading edge 252 of the web 48 is similarly shaped at a sharply acute angle $a$ of 5° but the blunted edge 254 of the ridges 40 is obtained by grinding the leading edge 252 on a blunter angle $c$ which may be in order of 40° or 45°.

Referring now to FIG. 1, in use tool 10 is grasped by its hand grip portion 16 and blade 12 and held firmly against the surface T of the tire. With the tire rotating in the direction indicated by the arrow A, those mold protuberances or tips P which align with the recesses 60 between the leading ends of the raised projections 40 and enter the recesses are wedged by said recesses between the opposed sharpened sides 62 and against the acutely sharpened apex 64 thereof so as to be sheared with continued rotation of the tire. Those protuberances or tips P', as well as loose trimmings which do not align with recesses 60 are channeled into the hollows 42 or clearance areas beneath the raised ridges 40 on either side of said webs 48. As said uncut protuberances P' enters said hollows 42, they may be slightly bowed as illustrated for example in FIG. 7, but are free to move or pass unimpeded beneath the blade and outwardly therefrom with continued rotation of the tire. Of consequence the webs 48 are not lifted from the tire surface and bouncing of the tire trimmer blade on the tire is not a problem. Therefore it is possible to maintain essentially continuous contact of the webs 48 with the rotating tire surface and with no bounce to interrupt a close shearing of the tips P.

The invention further contemplates that the folds 40 are closely arranged both to provide a maximum number of cutting recesses 60 in the leading edge of the blade and also to restrict the effective width of the cutting recesses 60 at their mouth to be only slightly greater than the diameter of protuberances P. The slope to which the underside of the ridge walls 50 are ground in forming said recesses is also kept relatively short (in the order of ½ inch) with the result that the protuberances which align with and enter the recesses are wedged at the base 64 of the recesses by the recessed sides 62. As indicated, the cutting edges at the base 64 of the recess are most acute and wherefore the wedged protuberances are sheared close to the tire surface keeping stubble to a minimum. Also, in accordance with the invention, the handle of the holder is so inclined to the plane of the blade webs that the blade may be so held that only its shearing edge 52 (FIG. 5), 152 (FIG. 8), 252 (FIG. 10) engages the tire surface because of the described blunting of the ends of the ridges immediately above said shearing edge of the recesses. This is possible without danger of digging into or injuring the tire surface. Also because there is minimum contact with the tire surface during the shearing act heat build up is kept at a minimum.

Thus in accordance with the invention, stubble is kept to a minimum by keeping the recesses 60 relatively short, their width relatively narrow and their cutting edge 64 low and sharp, at the same time maintaining the cutting edge of the webs 48 firmly against the tire surface T while providing clearance beneath the raised ridges 40 on either side of the recesses and webs 48 for passage of trimmings and uncut mold tips through the blade without lifting the blade and thereby raising the cutting height of said cutting edge 64.

FIG. 10 illustrates that usefulness of the blade may be doubled by sharpening the underside of both its leading and trailing ends such that when one edge is worn and becomes dull and blade may be renewed by simply removing it from the holder 10 as aforedescribed and reversing the blade so that the trailing edge now becomes the leading edge of the blade in subsequent use of the tool.

FIGS. 12 and 13 illustrate a further embodiment of the invention wherein the leading and trailing edges of the upper side of the blades are also sharpened to increase the utility of the blades fourfold. As indicated in FIGS. 12 and 13, this necessitates raising the height of the undulations such that the upper edge 148 of the undulations lie in a plane similarly spaced from the plane of the flanges 22 as does web 48 to provide the necessary clearance for slotted end portions 18 in use of the tool. In FIG. 13 the slope of the underside 44 of both the leading and trailing edge of the blades (including both the top and bottom) are shown ground on a short radius as previously described in connection with the embodiment of FIG. 5. In the alternative, it will be appreciated, however, that any one or more of said four sloping edges 44 may be sharpened at an acute angle as indicated at 152 in FIG. 8 which merges into an arcuate section as indicated at 154 (FIG. 8) or a second more bluntly angled surface 254 (FIG. 10).

Many other variations and/or modifications of the invention will be at once apparent or will become so upon consideration of the aforesaid description of the presently preferred embodiments of the invention.

Further, from the aforedescribed preferred embodiments of the invention it will be seen that all of the recited objects, advantages and features thereof have been demonstrated as obtainable in a highly practical manner and in a tool which is both efficient and effective in its use, as well as being one that is economical and practical to manufacture.

Having described the invention, what is claimed is:

1. Tire trimming tool useful to remove mold protuberances or flash from a tire comprising an elongate handle having a pair of blade holding rods with slotted ends in which are received the ends of a metal blade positioned between said rods, the blade between its mounted ends embodying generally straight and parallel raised ridges having outwardly displaced sidewalls and intervening narrow webs therebetween, the ridges including their sidewalls and the webs extending in a direction generally axially of the handle, and the forward end of the blade having recesses between the ridges such that the leading edge of the webs trail the forward end of the ridges, the underside of the web leading edges being sharpened and the underedge of the portion of the ridges leading the web leading edge sloping rearwardly to the spaced-therebehind sharpened leading edge of the webs between the raised ridges which ride on the tire surface in use of the tool to catch and wedge mold protuberances or tips of the tire carcass for shearing by the sharpened leading edge of the webs, the forward end of the ridges being bluntly disposed and spaced above the sharpened underside of the web leading edges to avoid digging into the tire surface during use of the tool, and the underside of the ridges being disposed above the webs along their full length to provide clearance paths therebeneath and to either side of the webs through which mold protuberances or flash missed by the recesses are free to pass without raising the webs of the blade off the tire carcass surface.

2. The tire trimming tool of claim 1 wherein the blade is set at an angle inclined to the general plane of the handle to provide clearance for the operator's hand in use of the tool.

3. Tire trimming tool as claimed in claim 1 including lock means slidably carried by the rods which releaseably force the rods toward each other to retain the blade with its ends in said slotted ends of the rods.

4. Blade for a tire trimming tool used to remove mold tips from tire carcasses comprising a sheet metal member embodying a plurality of straight and generally parallel raised ridges with displaced intervening narrow webs therebetween, the ridges having opposed sidewalls which define a hollow on the underside thereof extending the full length of the ridges and open at the front and rear ends of the ridges, the underside of the intervening webs defining a common plane, and the forward end of the blade having recesses between the ridges defined by the leading edge of the webs which trail the leading ends of the ridges and by portions of the ridge walls disposed between the leading ends of the said ridges and the leading edges of the webs, the underside of the web leading edges being acutely sharpened and the underedge of said portions of the ridge walls being inclined to said common plane and merging into the acutely sharpened under side of the web leading edges, and the leading ends to the ridges lying above said common plane and bluntly disposed thereto and to the inclination of the underedge of the ridge walls.

5. Blade as claimed in claim 4 having mounting flanges at either side thereof.

6. Blade as claimed in claim 4 wherein the under edge of said portions of the ridge walls comprises a compound angle, the leading portion of which is less acute than the portion at the leading edge of the web and defines the bluntly disposed end of the ridges.

7. Blade as claimed in claim 4 wherein the leading under edge of said portion of the ridge walls comprises an arc turned on a radius and tangent to a plane comprising the underside of the web leading edge.

8. Blade as claimed in claim 4 wherein the acutely angled under edge of said portions of the ridge walls is preceded by a radius blunting the leading end of the ridges.

9. Blade as claimed in claim 4 wherein the underside of the trailing edge of the ridge walls slopes forwardly to the trailing edge of the web which is spaced forwardly thereof, the slope being relatively acute at the web and blunt at the ridge walls.

10. Blade as claimed in claim 4 wherein the corresponding under edges and underside of the trailing end of the blade are similarly disposed as the under edges and undersides of the forward end of the blade but in reverse direction.

11. Blade as claimed in claim 4 wherein the underside and upperside of both the forward and trailing ends of the blade are disposed and provided with the recesses having sharp cutting edges similar to the cutting edges of the underside of the forward end of the blade.

* * * * *